H. & F. Moore,

Saw Frame.

No. 4,276. Reissued Feb. 21. 1871.

Witnesses
Chas H. Smith
Geo. D. Walker.

Bissell & Moore Mfg. Co.
Lemuel W. Serrell
atty.

N. PETERS, PHOTO-LITHOGRAPHER, WASHINGTON, D. C.

UNITED STATES PATENT OFFICE.

THE BISSELL & MOORE MANUFACTURING COMPANY, OF NEW YORK, N. Y., ASSIGNEES OF DANIEL AND EDWIN MOORE.

IMPROVEMENT IN SAW-FRAMES.

Specification forming part of Letters Patent No. 94,500, dated September 7, 1869; Reissue No. 4,276, dated February 21, 1871

*To all whom it may concern:*

Be it known that DANIEL MOORE and EDWIN MOORE, of Brooklyn, E. D., in the county of Kings and State of New York, invented and made a new and useful Improvement in Saw-Frames; and the following is hereby declared to be a full, clear, and exact description of the said invention.

This invention is for a compound thrust-brace to a saw-frame, that acts in connection with a tightener to strain the saw and prevent the frame moving when in use.

Figure 2:
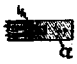
Figure 1:
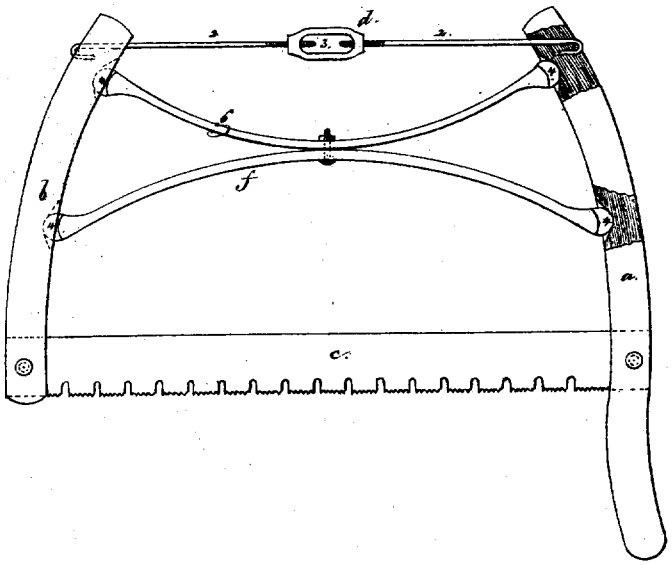

In the drawings, Figure 1 is a side view of a saw-frame fitted with the improvement, a portion of one of the handles being in section; and Fig. 2 is a horizontal section at one of the joints.

*a* represents the handle portion of the saw-frame; *b* is the opposite portion of the frame; *c* the saw, and *d* is a tightener for drawing the upper ends of the saw-frame together. This tightener is shown as made of rods 2 2, with looped ends passing into mortises in the upper ends of the frames *a b*, and these rods 2 2 have right and left hand screw-threads on them, taking the screw-shackle 3. The compound thrust-brace is made with rounding ends, as seen at 4, setting into correspondingly-shaped recesses in the faces or inner edges of the frame *a b*, and the tenons and mortises are also rounded, as shown. This compound thrust-brace is shown as arcs of circles, or as toggles *f g*, and the straining of the saw is effected by forcing the stretcher *f* into a more nearly straight form, and thereby increasing the distance between the joints 4 of the stretcher *f*. The counter stretcher or brace *g* is shown as attached near the middle to the stretcher *f*, and the ends enter rounding recesses in *a* and *b*. These stretchers *f* and *g* form arcs of circles, the convex sides being placed together; hence, when the tightener *d* draws the ends of *g* towards each other and make the same the arc of a smaller circle, the stretcher *f* will be forced into a more nearly straight form, straining the saw by pressing against the inner edges of the frames *a b*.

A saw-frame with a single stretcher or thrust-brace is not claimed, neither a thrust-brace and diagonal bar, nor a pair of tension-braces and a thrust-brace.

What is claimed as the invention of DANIEL MOORE and EDWIN MOORE is—

A saw-frame made with end pieces, *a b*, a tightener, *d*, and compound thrust-braces, substantially as set forth, introduced between the end pieces, so that the ends of the said braces nearest the saw shall be spread apart by the act of drawing the other ends of such braces nearer together, substantially as described.

Dated this 6th day of June, A. D. 1870.

BISSELL & MOORE MANUFG. CO.,
Per GEO. H. BISSELL,
*President.*
EUGENE BISSELL,
*Secretary.*

Witnesses:
CHAS. H. SMITH,
GEO. T. PINCKNEY.